June 13, 1961  G. FROMONT  2,987,798
PROCESS FOR THE MANUFACTURE OF HOLLOW METAL BODY
Filed Aug. 22, 1956  3 Sheets-Sheet 1
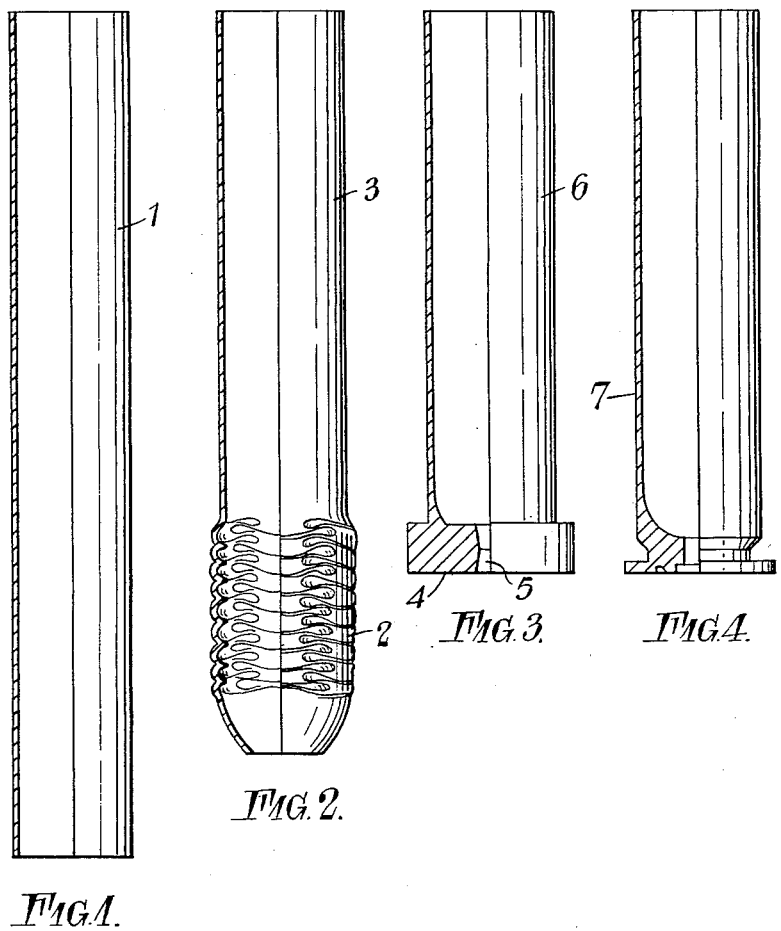

June 13, 1961 G. FROMONT 2,987,798
PROCESS FOR THE MANUFACTURE OF HOLLOW METAL BODY
Filed Aug. 22, 1956 3 Sheets-Sheet 2

Inventor:
George Fromont,
by Singer, Stern & Carlburg
Attorneys.

United States Patent Office 2,987,798
Patented June 13, 1961

2,987,798
PROCESS FOR THE MANUFACTURE OF HOLLOW METAL BODY
George Fromont, Antwerp, Belgium, assignor to Barkway Engineering Company Limited, London, England, a British company
Filed Aug. 22, 1956, Ser. No. 605,501
Claims priority, application Belgium Aug. 26, 1955
1 Claim. (Cl. 29—1.31)

This invention relates to a process for the manufacture of hollow bodies of metal, particularly cartridge cases, to apparatus for carrying the process into effect, and to the hollow bodies thus produced, and has for its object to obviate disadvantages hitherto met with in making such hollow bodies, particularly small or large calibre cartridge cases, from steel or other ferrous metal in place of the more usual brass.

The process according to the present invention has, as starting material, a desired length of metal tube, particularly of steel tube (which may be as drawn without reheating or annealing) of well-defined gauge and diameter which, as a first step, is well and closely supported peripherally, preferably both on the interior and exterior, from one end and over a part of its length and whilst so supported, is subjected in the cold state to a force of compression, axially applied from end to end, to uniformly crumple circumferentially the unsupported part; the crumpled part is subsequently "forged," that is to say compressed while hot, the whole thus forming a member comprising a hollow part proper with a thickened end shaped according to the hollow body to be manufactured.

Preferably, after the crumpling action the crumpled part is heated to bring the metal thereof into a state ready to flow under pressure, and the heated crumpled part (with or without a continuation of the heating) located in a surrounding matrix, is then subjected to the axially applied action of a compressing ram to cause the heated metal of the crumpled part to flow and to force said heated metal into conformity with the shape of the matrix.

This shape will vary in accordance with the nature of the hollow articles being produced. It may be that of the article to be produced or, more likely, a shape to allow subsequent operations to produce the articles. For example, where these are cartridge cases the shape must be such to permit the machining to form the normal end of the cartridge case which may include an annular groove or grooves and a projecting rim or flange.

In carrying the process according to the invention into effect, any suitable presses can be employed and any suitable heating means. However, in preferred methods the heating of the crumpled part is effected electrically by utilising the said crumpled part as a resistance in an appropriate circuit. In utilising this method the crumpled part is brought into the circuit in two distinct phases, the first to ensure an efficient and adequate connection of the crumpled part in the circuit and the second to close the circuit for the current to flow therethrough and heat the crumpled part.

What may be termed the "preliminary formation" comprised by the integral crumpled and uncrumpled parts of a tube, can have the crumpled part heated before being enclosed by the matrix, or preferably the crumpled part is heated whilst enclosed in the matrix and positioned for the immediate operation of the compressing ram.

In order that the invention may be better understood, it will now be described with reference to the accompanying drawings, which are given by way of example only and in which:

FIGS. 1 to 4 show diagrammatically, each in part sectional elevation and part elevation, the four successive stages in the production of a cartridge case, made by the process according to the invention, respectively: the starting material, i.e. a length of steel tube; the "preliminary formation," i.e. the steel tube crumpled at one end; the steel tube with one end shaped in and by the matrix (hereinafter termed the "casting"); the cartridge case with the shaped end machined.

Figure 8:
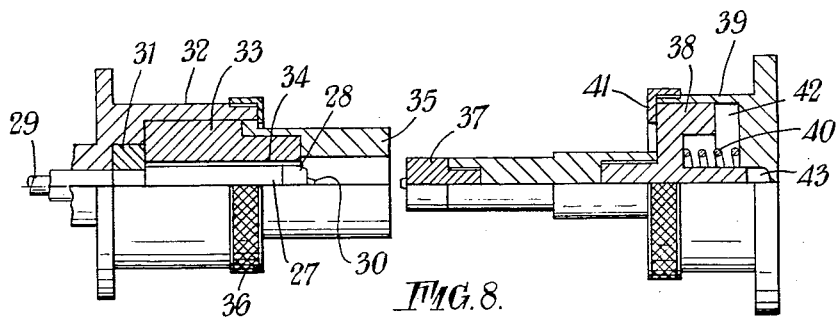
FIG. 8 shows, diagrammatically, in part sectional elevation and part elevation, the two portions of an apparatus for transforming a "preliminary formation" (FIG. 2) into the "casting" (FIG. 3).
Figure 9:
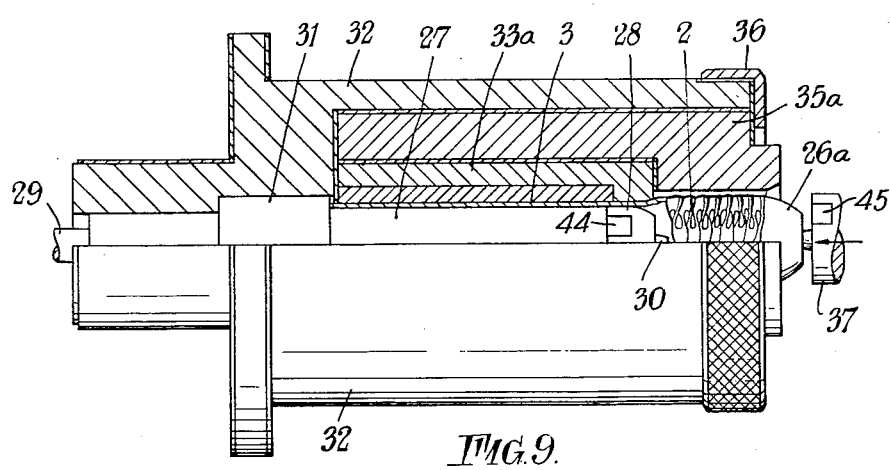
Figure 10:
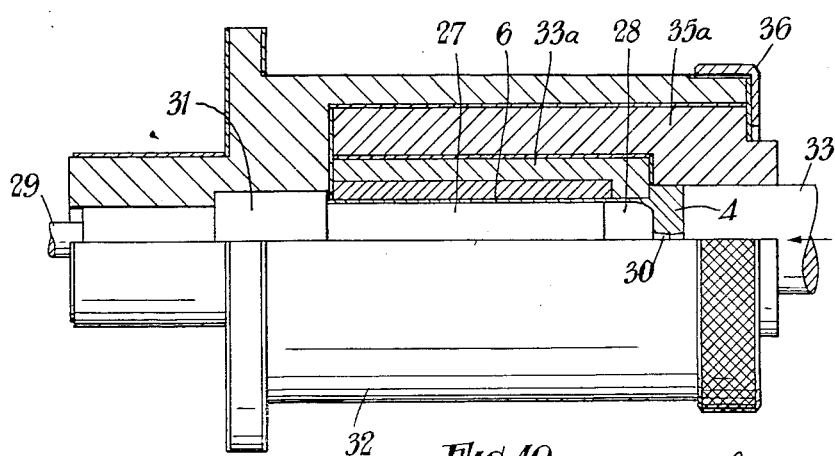

FIG. 9 shows to a larger scale than FIG. 8, a portion of an apparatus somewhat different but generally similar to the left-hand portion of FIG. 8, with the "preliminary formation" (FIG. 2) in position ready for the co-operative action of the compressing ram of the other left-hand portion and for the electrical heating, and finally FIG. 10 shows a similar view to FIG. 9 at the completion of the heating and compressing action of the ram to form the "casting" (FIG. 3).

In the drawings, particularly FIGS. 1 to 4, 1 is the steel tube the length of which is to some extent determined by the mass of metal required for the hollow body to be manufactured, which tube, supported over a part of its length, is subjected to an axially applied force of compression to effect the crumpling 2 of the unsupported portion of the tube and produce the "preliminary formation" 3. The crumpled part is heated and then subjected to a species of combined forging and pressure casting, by the action of a compressing ram to effect the end shaping 4 having a central aperture 5 and produce the "casting" 6. This latter is subsequently machined to produce the finished hollow body, that is, the cartridge case 7.

Figure 5:
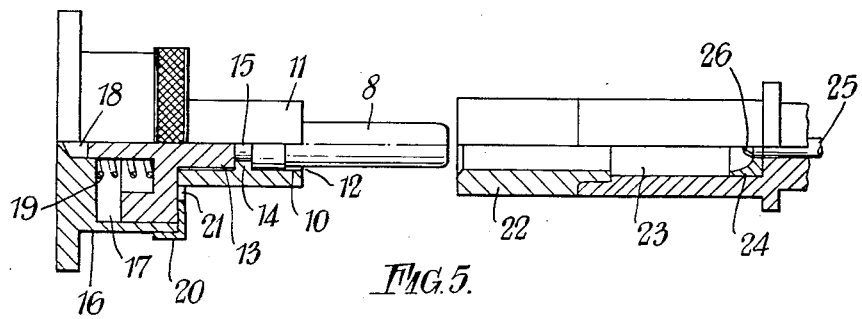
FIG. 5 shows diagrammatically in part sectional elevation and part elevation, the two portions of an apparatus for transforming the starting material (FIG. 1) into the "preliminary formation" (FIG. 2).
Figure 6:
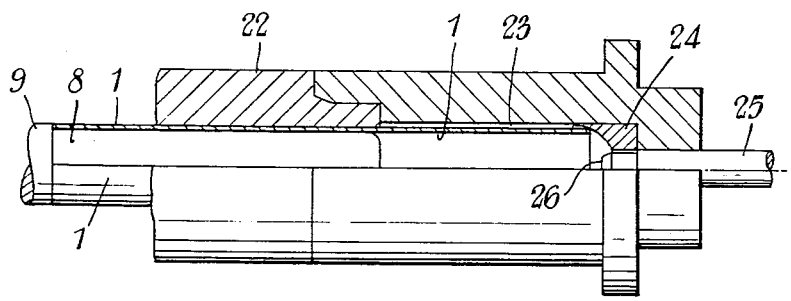
FIG. 6 shows to a larger scale the right-hand portion of FIG. 5 with the "starting material" in position ready for crumpling.
Figure 7:
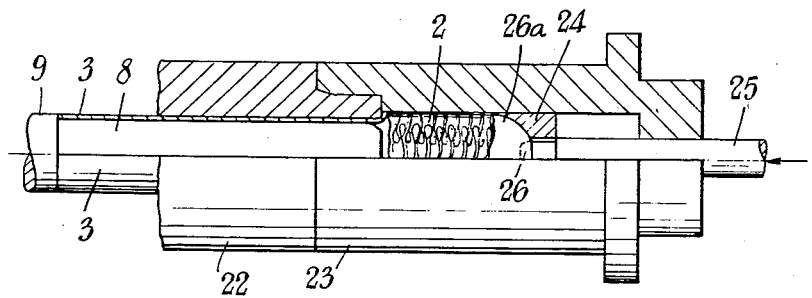
FIG. 7 shows a similar view to FIG. 6 at the completion of the crumpling operation.

To transform the tube 1 into the "preliminary formation" 3, the apparatus shown in FIGS. 5, 6 and 7 is employed. In its essentials, this comprises a cylindrical mandrel 8 of precise diameter which is equal to the inner diameter of the tube 1 to enable said tube to be supported thereon without play. The mandrel is extended into a head 9 which engages in the bore 10 of a sleeve 11, the diameter of which bore 10 is slightly greater than the exterior diameter of the tube 1. The bore 10 has a greater axial length than the head 9 so that an annular space 12 is left between the mandrel 8 and the bore 10 into which can be fitted one end of the tube 1.

The head 9 is made integral with a piston 13 and these parts are connected to the sleeve 11 by an internal annular rib 14 thereof which fits an annular groove 15 between the head 9 and the piston 13. This latter moves in a fixed cylinder 16 having free spaces 17 and 18 to permit a limited axial movement. The mandrel has the same movements and the movable parts are subject to the action of a return compression spring 19 located between the piston and cylinder. The outward stroke of the piston is limited by an annular stop 20 the inner flange of which has an opening 21 of large diameter for the unhindered passage of the sleeve 11.

In axial alignment with these tube supporting parts is disposed a complementary apparatus comprising a socket 22 the inner diameter of which is equal to the diameter of the bore 10 and the length of which equals that of the projecting portion of the mandrel 8 from said bore. This socket 22 fits and extends into a "mould" 23 having an internal diameter equal to the diameter of the tube 1, taken on the exterior of the crumpling and having a length at least equal to that of the part of the tube to be crumpled, plus the axial length of a stamping head 24. This head has a dished contact face and is securely carried by the ram 25 the frusto-conical extremity 26 of which projects axially from the contact face.

The operation of the apparatus shown in FIGS. 5, 6 and 7 is as follows: At the start, the two axially aligned groups of parts are spaced apart and the tube 1 is fitted on the mandrel 8 with one end housed in the annular space 12 and the other projecting well to the front of the free end of the mandrel. The two groups of parts are then relatively brought closer together, by the axial movement of the second described group towards the first group which is fixed.

In this manner the position shown in FIG. 6 is reached with the tube 1 well and closely supported peripherally both on the interior and exterior over all of that part of its length which is to remain intact and the remaining part axially located in the mould 23, the actual end being in contact with the dished contact face of the head 24.

By continued relative movement of the groups beyond the position shown in FIG. 6, the position of FIG. 7 is reached where it will be seen that this continued movement has resulted in the uniform crumpling circumferentially of the unsupported portion of the tube 1 which is in the cold state, the actual end part of the tube having a cup-like form produced by the dished surface of the head 24, with an aperture which abuts the projection 26a.

In this manner the "preliminary formation" 3 is produced and can be removed by separating the two groups of parts and the withdrawal of the cap 22 from the mould 23, ready to be formed into the casting (FIG. 3) by the apparatus shown in FIGS. 8 to 10.

This apparatus is constituted by two groups of parts. The first (FIG. 8) comprises a mandrel 27 the diameter of which is substantially that of the inner diameter of the tube and this mandrel is prolonged into a head 28 fixed to the end of a rod 29 the outer end of which forms a frustoconical projection 30. The length of the mandrel 27 plus that of the head equals the length of the tubular part of the "preliminary formation." The mandrel 27 is fixed, for example by being screwed, into a ring 31 located in a casing 32 and said mandrel with its head 28 are located in an enveloping member 33 the inner diameter of which is substantially equal to the outer diameter of the tube, in order to leave an annular space 34 to receive the tubular part of the "preliminary formation" which when positioned is supported peripherally both internally and externally over the whole of its length. 35 is a forging and casting matrix which is in the axial extension of the envelope 33 and the inner diameter of which can receive the crumpled part 2 of the "preliminary formation" 3 and which determines the diameter to be given to the shaped enlargement at the end of the "casting" to be formed. By suitable insulation, not described, only the mandrel 27 and head 28 are included in the operative electrical circuit. The matrix 35 is connected to the envelope 33 and casing 32 by a screwed ring 36.

The second group of parts of this apparatus (FIG. 8) comprises a forging stamp 37 extending from a piston 38 having a predetermined short stroke in a cylinder 39 and having a return compression spring 40 and co-operating ring stop 41; the spaces 42 and 43 set the limit to the stroke of the piston and forging stamp.

The operation of this apparatus is as follows: At the commencement, the two groups of parts are spaced apart and the "preliminary formation" 3 is disposed on the mandrel 27 so that its tubular part is well supported both internally and externally. The two sets of parts are relatively brought together by moving the second described group towards the first described fixed group.

This continues until the stamp 37 abuts the end of the crumpled portion 2 and is held forcibly pressed against said stamp by the continued movement of the cylinder 39 to compress the spring 40.

Up to this point the electrical circuit is kept open so that the best possible electrical connection is made between the forging head 37 and the "preliminary formation" which is on the mandrel 27.

After this, however, the electrical circuit containing the contacts 44 and 45 as diagrammatically indicated in FIG. 9 is closed and this heats the crumpled part 2 to a forging temperature, which brings the metal thereof into a state ready to flow under pressure. This takes place by the continued movement of the forging head 37 until the position of FIG. 10 is attained, where it will be seen that the metal of the crumpled end under a species of combined forging and pressure casting operations has taken the shape of the matrix 35a, to produce with the uncrumpled tubular portion, the casting 6 (FIG. 3). In the somewhat different apparatus shown in FIGS. 9 and 10, the envelope in the casing 32 is designated with 33a.

After this the electrical circuit is opened, the forging head withdrawn, by reversing the movement of its ram, and the casting 6 ejected, ready for the necessary machining operations to produce the finished cartridge case 7, shown in FIG. 4.

Although the process according to the invention is particularly suitable for the production of hollow articles of steel or other ferrous metals, it must be understood it can also be utilized with other metals. Again, although more particularly the production of cartridge cases has been dealt with, other hollow articles may be produced.

Further, it should be pointed out that the electrical heating means and the circuit therefor, although not particularly described, may have any necessary arrangement and include any necessary components for the purpose, which in themselves are known.

The invention is not limited to the precise forms or details of construction herein described, as these may be varied to suit particular requirements.

What I claim is:

A process for manufacturing cartridge cases from uniform lengths of drawn steel tubing of uniform and well defined gauge and diameter, the steps of supporting the tube peripherally from one end and over a part of its length leaving one unsupported length, cold working said tube by subjecting the unsupported length of tube to a compression force applied axially from end to end to uniformly and circumferentially crumple and corrugate the unsupported length of tube and form overlapping laminations so that the overlaps of the crumpled portion extend equal distances beyond the inner and outer periphery of the tube, heating the unsupported length of tube to a forging temperature, and finally subjecting the heated part to pressure in the chamber of a mold by means of compression force to cause the heated metal of the crumpled part to produce a phase change in the metal and force said heated metal in conformity with the shape of the mold chamber, said heating being of a temperature such that the crumpled portion is transformed by casting under the pressure involved into a casting of the shape of the mold.

References Cited in the file of this patent

UNITED STATES PATENTS

| | | |
|---|---|---|
| 604,137 | Bishop | May 17, 1898 |
| 2,079,102 | Biginelli | May 4, 1937 |
| 2,089,912 | Biginelli | Aug. 10, 1937 |
| 2,371,716 | Snell | Mar. 20, 1945 |
| 2,513,739 | O'Niell | July 4, 1950 |

FOREIGN PATENTS

| | | |
|---|---|---|
| 433,829 | Great Britain | Aug. 21, 1935 |
| 479,779 | Germany | July 22, 1929 |